(12) United States Patent
Veeraraghavan et al.

(10) Patent No.: US 8,405,763 B2
(45) Date of Patent: Mar. 26, 2013

(54) VIDEO CAMERA FOR RECONSTRUCTING VARYING SPATIO-TEMPORAL RESOLUTION VIDEOS

(75) Inventors: Ashok Veeraraghavan, Cambridge, MA (US); Dikpal N Reddy, College Park, MD (US); Amit Agrawal, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 34 days.

(21) Appl. No.: 12/977,743

(22) Filed: Dec. 23, 2010

(65) Prior Publication Data

US 2012/0162457 A1  Jun. 28, 2012

(51) Int. Cl.
*H04N 5/238* (2006.01)
*H04N 5/228* (2006.01)
*G06K 9/34* (2006.01)

(52) U.S. Cl. ............... 348/367; 348/222.1; 382/171

(58) Field of Classification Search ............ 348/222.1, 348/239, 296–297, 362–363, 367, 370–371; 396/89, 268; 382/105, 112, 171, 121–127; 375/240.08, 240.18

See application file for complete search history.

(56) References Cited

U.S. PATENT DOCUMENTS

| | | | | |
|---|---|---|---|---|
| 7,639,289 B2 * | 12/2009 | Agrawal et al. | | 348/239 |
| 7,792,423 B2 * | 9/2010 | Raskar et al. | | 396/268 |
| 7,965,936 B2 * | 6/2011 | Raskar et al. | | 396/268 |
| 2001/0050712 A1 * | 12/2001 | Dunton et al. | | 348/220 |
| 2006/0165179 A1 * | 7/2006 | Feuer et al. | | 375/240.18 |
| 2007/0258707 A1 * | 11/2007 | Raskar | | 396/52 |
| 2008/0187305 A1 * | 8/2008 | Raskar et al. | | 396/268 |
| 2008/0266655 A1 * | 10/2008 | Levoy et al. | | 359/368 |
| 2009/0273843 A1 * | 11/2009 | Raskar et al. | | 359/601 |
| 2010/0003024 A1 * | 1/2010 | Agrawal et al. | | 396/340 |
| 2010/0265386 A1 * | 10/2010 | Raskar et al. | | 348/340 |
| 2011/0075020 A1 * | 3/2011 | Veeraraghavan et al. | | 348/367 |
| 2011/0242341 A1 * | 10/2011 | Agrawal et al. | | 348/218.1 |
| 2011/0243442 A1 * | 10/2011 | Agrawal et al. | | 382/173 |

* cited by examiner

*Primary Examiner* — Kelly L Jerabek
(74) *Attorney, Agent, or Firm* — Gene Vinokur; Dirk Brinkman

(57) ABSTRACT

A camera for acquiring a sequence of frames of a scene as a video includes a sensor with an array of sensor pixels. Individual sensor pixels are modulated by corresponding modulation functions while acquiring each frame of the video. The modulation can be performed by a transmissive or reflective masked arranged in an optical path between the scene and the senor. The frames can be reconstructed to have a frame rate and spatial resolution substantially higher than a natural frame rate and a spatial resolution of the camera.

25 Claims, 4 Drawing Sheets

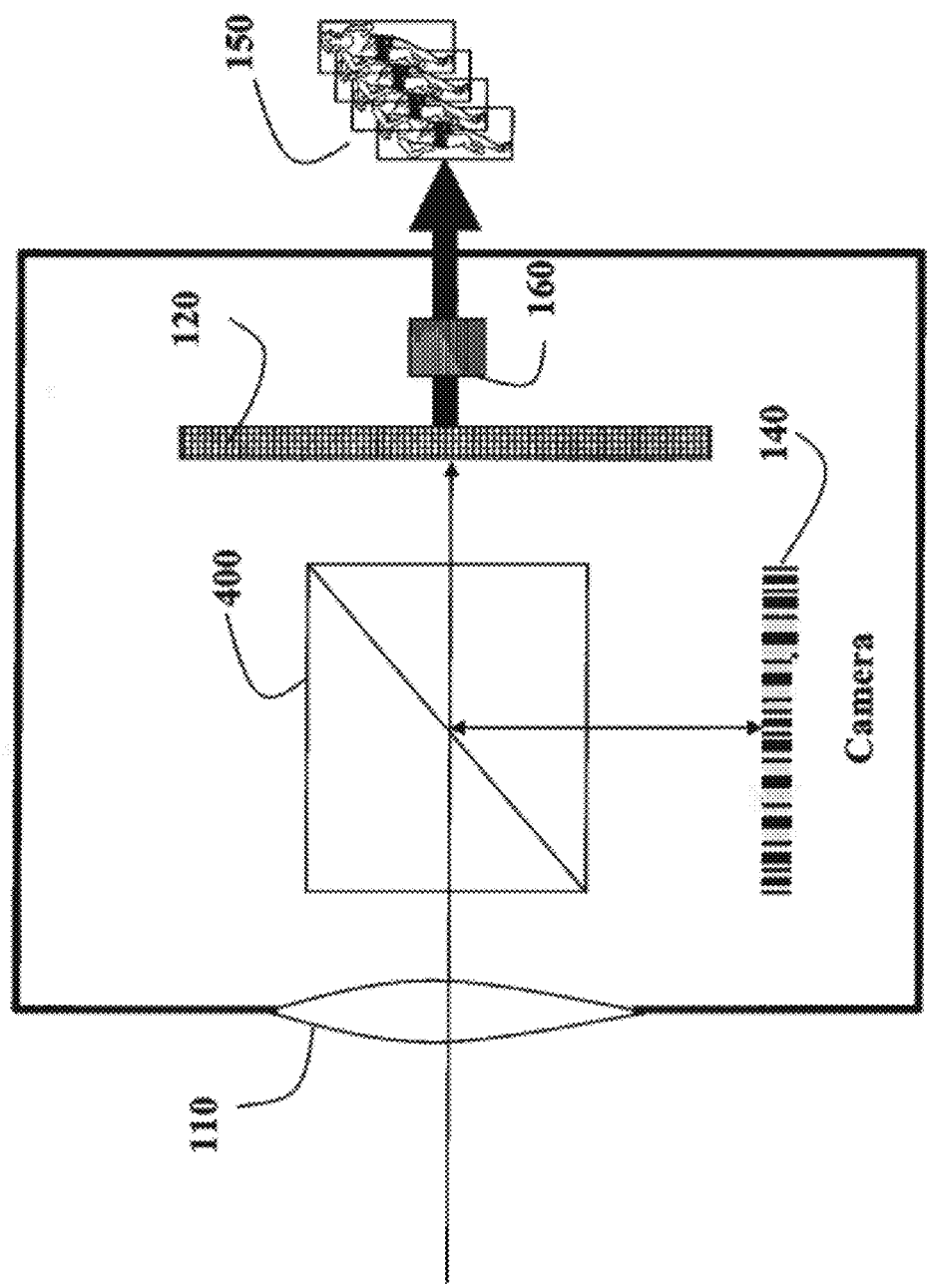

VIDEO CAMERA FOR RECONSTRUCTING VARYING SPATIO-TEMPORAL RESOLUTION VIDEOS

FIELD OF THE INVENTION

This invention relates generally to video cameras and video processing, and more particularly to video cameras from which varying spatio-temporal resolution videos can be reconstructed.

BACKGROUND OF THE INVENTION

The spatial resolution of conventional video cameras is steadily increasing, e.g., from 1 to 20 megapixel, or greater. However, the temporal resolutions of most conventional video camera remains limited, e.g., 30 to 60 frames per second (fps).

High speed video cameras are technically challenging and expensive because of the requirement for a high bandwidth, light efficiency, and throughput. Usually, high speed cameras have limited memory, and a dedicated bus that directly connects the memory to the sensor. The frame rate is limited by the memory size.

For example, in the Photron FastCam SA5, which is one of the most powerful high speed cameras, that amount to a maximum of three seconds of video at 7500 fps with a 1 megapixel resolution. High speed cameras also need to have specialized sensors that have high light sensitivity and image intensifiers so that each acquired frame is above the noise level to enable subsequent processing of the frames. The FastCam SA5 can reach a frame-rate of about 100,000 fps at a spatial resolution of 320×192 pixels and a cost of about $300,000.

Single and Multi Frame Spatial Super-Resolution

Methods for generating spatial super-resolution from multiple frames are well known. Unfortunately, there are fundamental limits to those methods. The limits can be overcome with the availability of additional prior information either in the form of examples of matching high-low resolution frame pairs, or by modeling frames as being compressible in an appropriate transform basis.

Temporal Super-Resolution

Spatio-temporal super-resolution can be obtained from videos acquired by multiple cameras with staggered exposures to sense dynamic events without motion blur and temporal aliasing. A dense camera array can also generate a very high speed video by converting a collection of 30 fps cameras into an equivalent virtual camera with thousands of frames per second. While those systems demonstrate that multiple cameras can be used for temporal super-resolution, they are expensive, require multiple cameras with accurate synchronization and scales only linearly with number of cameras.

Video Interpolation

Because the frame rate of the cameras and display devices can be different, there has always been a need to resample and interpolate the acquired frames for display purposes. Several techniques for such software 'frame-rate conversion are known.

Motion Deblurring

When a video of high speed motion is acquired by a low frame-rate camera, one can either obtain noisy and aliased sharp images using short exposure durations, or acquire blurred images using longer exposure duration. Significant progress has been made in the problem of deblurring by incorporating spatial regularization terms within the deconvolution framework.

Compressive Sensing of Videos

Compressive sensing can be used to compressively acquire videos by assuming that multiple random linear measurements are available at each time instant, either using a snapshot imager, or by stacking consecutive measurements from a single pixel camera (SPC). Given such a sequence of compressive measurements, prior models about the transform domain sparsity of the video are used to reconstruct the videos.

For videos with slowly changing dynamics, fewer measurements are needed for subsequent frames after the first frame is acquired. Video acquisition by compressively sampling each frame is possible if the motion and appearance can be iteratively estimated by using a motion compensated wavelet basis to sparsely represent the spatio-temporal pixel volume, i.e., voxels. Such methods, while being very attractive in principle, have only achieved moderate success, mainly because the temporal structure of videos is not explicitly modeled, and the hardware architectures for these methods are either cumbersome and/or expensive.

SUMMARY OF THE INVENTION

The embodiments of the invention provide a programmable pixel compressive video camera and video processing pipeline configured to acquire a sequence of frames of a scene as a video. Pixels of the sensor are modulated according to corresponding modulation functions, which can be discrete (ON/OFF), continuous, or adaptive to an application, a user, or the scene. The modulation can vary spatially, temporally, or both. The corresponding modulation functions can be different for pixels, subset of pixels or subpixels. For example, each pixel of a sensor of the camera is modulated at a rate substantially greater than the natural frame-rate of the camera, e.g., 240-480 frames per second (fps) using a 30 fps camera.

The means for modulation can be in the form of a mask arranged in an optical path between the scene and the sensor. The mask can be transmissive or reflective. Therefore, the intensities of individual pixels are individually modulated prior to integration at the sensor. Thus each frame is a coded projection of a corresponding video volume of voxels. This enables the camera to acquire a video that can be reconstructed at a perceived frame-rate that is substantially greater than the actual frame-rate of the camera. In one embodiment, the mask pixel resolution is substantially greater than the sensor pixel resolution. In another embodiment, the modulation rate is identical to the frame rate of the camera.

By explicitly modeling spatio-temporal constraints in the video, using optical flow based brightness or color constancy constraints, the underlying high speed video frames can faithfully reconstructed from the video. Hence, the video camera is a compressive camera.

With this camera and processing pipeline it is also possible to achieve spatio-temporal super-resolution videos. In addition, the video model and the reconstruction video method can also be used for applications such as video super-resolution, denoising, interpolation and deblurring without additional hardware.

BRIEF DESCRIPTION OF THE DRAWINGS

FIG. 4 is a schematic of a programmable pixel compressive camera with a reflective mask according one embodiments of the invention.

DETAILED DESCRIPTION OF THE PREFERRED EMBODIMENT

Programmable Pixel Compressive Video

Figure 1:
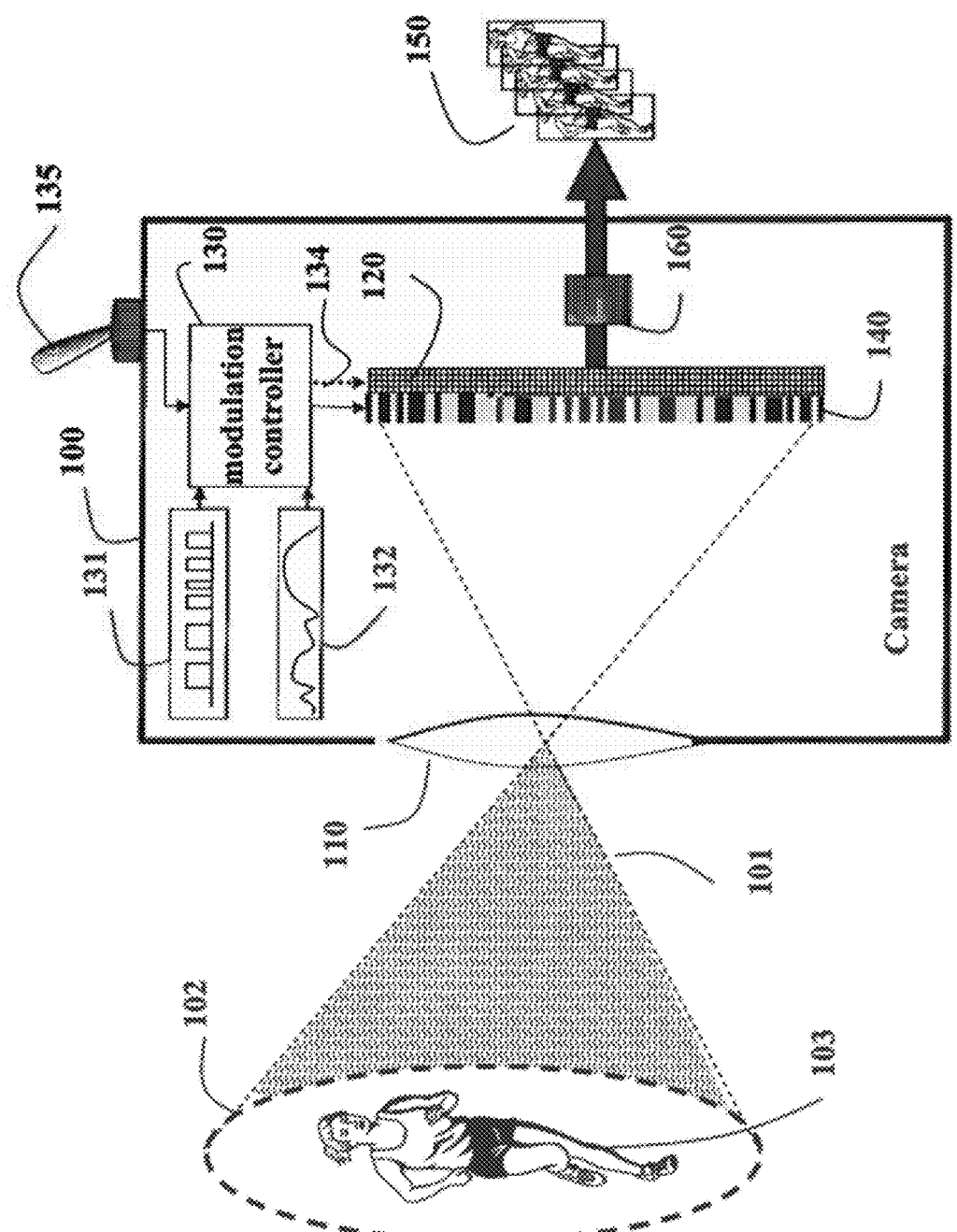
FIG. 1 is a schematic of a programmable pixel compressive camera according to embodiments of the invention.

FIG. 1 is simplified schematics of a programmable pixel compressive video camera 100 according to embodiments of our invention. The camera is configured to acquire a sequence of frames of a scene as a video. The camera includes a lens 110, a sensor 120, a modulation controller 130, and a spatio-temporal mask 140.

In the preferred embodiment, the camera is a digital video camera, and the sensor includes an array of sensor pixels, e.g., 0.25 megapixel. The sensor can include red, green and blue (RGB) pixels interleaved in a Bayer filter mosaic, i.e., a color filter array (CFA), where the color pattern is GRGB). The camera acquires a sequence of low temporal resolution frames 150 at 30 frames per second (fps), which is the natural frame rate of the camera.

Mask

The mask includes an array of mask pixels, e.g., 1 megapixel. In other words, a spatial resolution (mask pixel resolution) of the mask is substantially greater than a sensor pixel resolution. In this case, the mask defines subpixels on the sensor. It is understood that other resolutions are possible, including the mask having the identical resolution as that of the sensor, or a smaller resolution, e.g., equivalent to subsets of 2×3 or 5×5 sensor pixels.

Modulation Controller

The modulation controller individually modulates the pixels of the mask using corresponding modulation functions. The functions can be discrete 131 or continuous 132. If a function is discrete, the integration at the sensor pixel sensors is turned ON and OFF over the exposure time, e.g., at 480 fps. If continuous, the integration varies continuously. The functions can be independent and different for each pixel, subpixel, or subsets of pixels, e.g., a subset of 2×2, or 5×5 pixels. Alternatively, the modulation can be according to a gray scale function or a RGB color function.

It is noted that the modulation controller can be directly connect 134 to the sensor, in which case the mask is not required.

In another embodiment, the spatial and temporal modulation is user controlled, using a controller 135. This way the vidographer determines how the video is acquired as the scene unfolds.

In another embodiment, the modulation functions are adaptive and based on previously acquired frames, or uses prior knowledge from other sensor or application domains.

Figure 2:
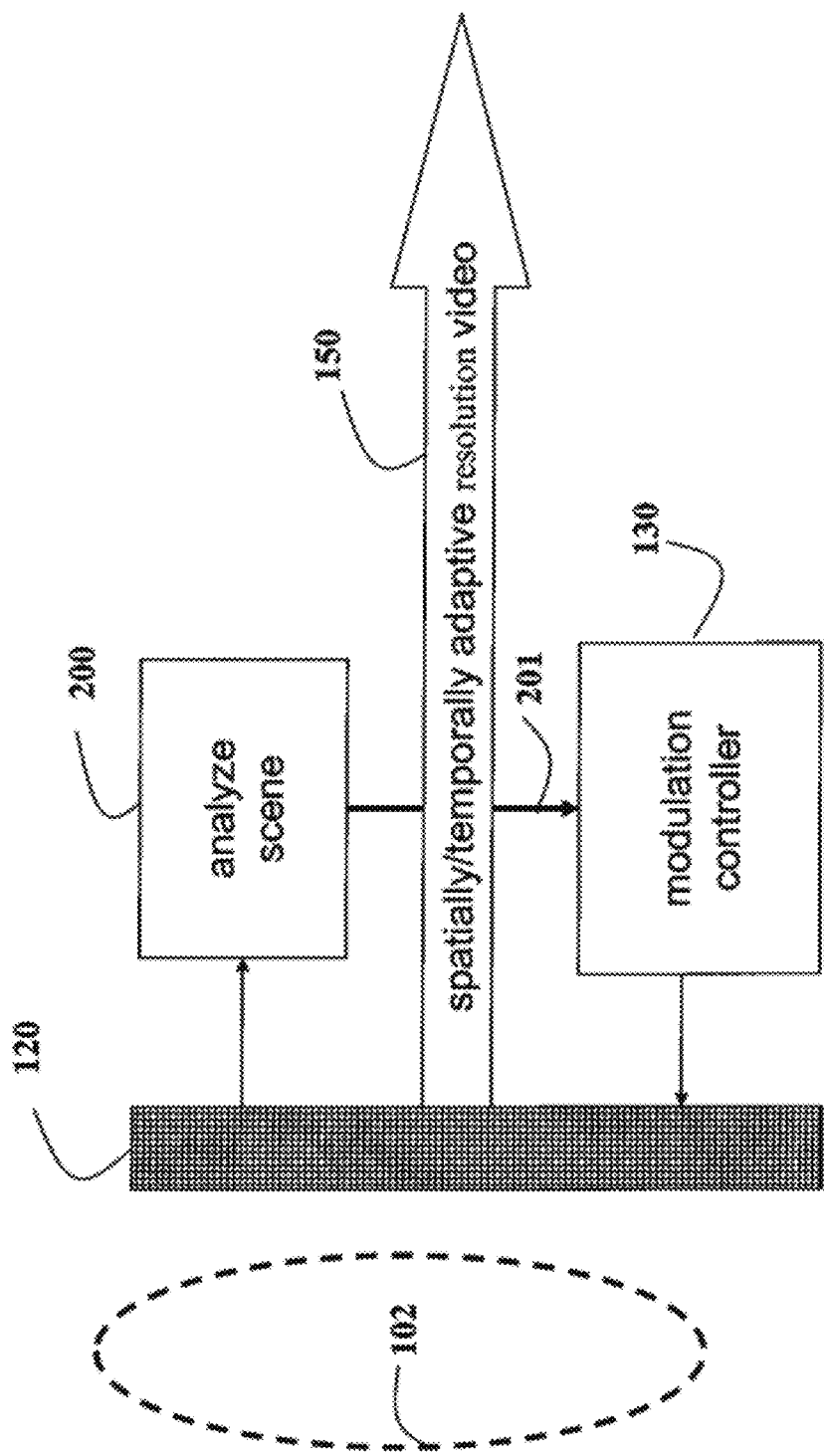
FIG. 2 is a schematic of a programmable pixel compressive camera with an adaptive modulation controller according one embodiment of the invention.

In one application as shown in FIG. 2, the scene 102 has static and dynamic features. A scene analyzer 200 determines the static and dynamic features, and feeds back to the modulating controller 130 adaptive temporal and spatial modulation functions 201 so to that the pixels can concentrate on capturing the dynamic features and less so on the static features to enhance the viewing experience.

The sensor can acquire an energy field 101 of a scene 102. The scene can include a moving object 103. The energy field can be any type of electromagnetic radiation, e.g., visible or infrared light.

Output of the camera is a sequence of frames 150, from which a video can be reconstructed having spatial and temporal resolutions different than spatial resolution of the sensor and the temporal resolution of the frame rate.

All embodiments essentially modulate the light field acquired by the individual pixels of the sensor 120 according to the corresponding modulation functions to generate an integrated frame during each exposure time. Different modulation functions can be used for different pixels. It should also be noted that the modulations functions can be arbitrary, or pseudo-random.

The mask can be the form of a fast high resolution modulator, e.g., a transmissive liquid crystal on silicon (LCOS), or a reflective digital micromirror (DMD) device, as shown in FIG. 4, in which case there is a beamsplitter 400 in the optical path. It is noted that up to now LCOS and DMD are mostly used in projectors, and not in camera as described herein.

In one embodiment, the acquired modulated frames are used with accompanying brightness constancy constraints and a wavelet domain sparsity model in a convex optimization framework to reconstruct high the resolution high-speed video. Alternatively, a sparsity of discrete cosine transform basis or Fourier basis can be used.

Method

Figure 3:
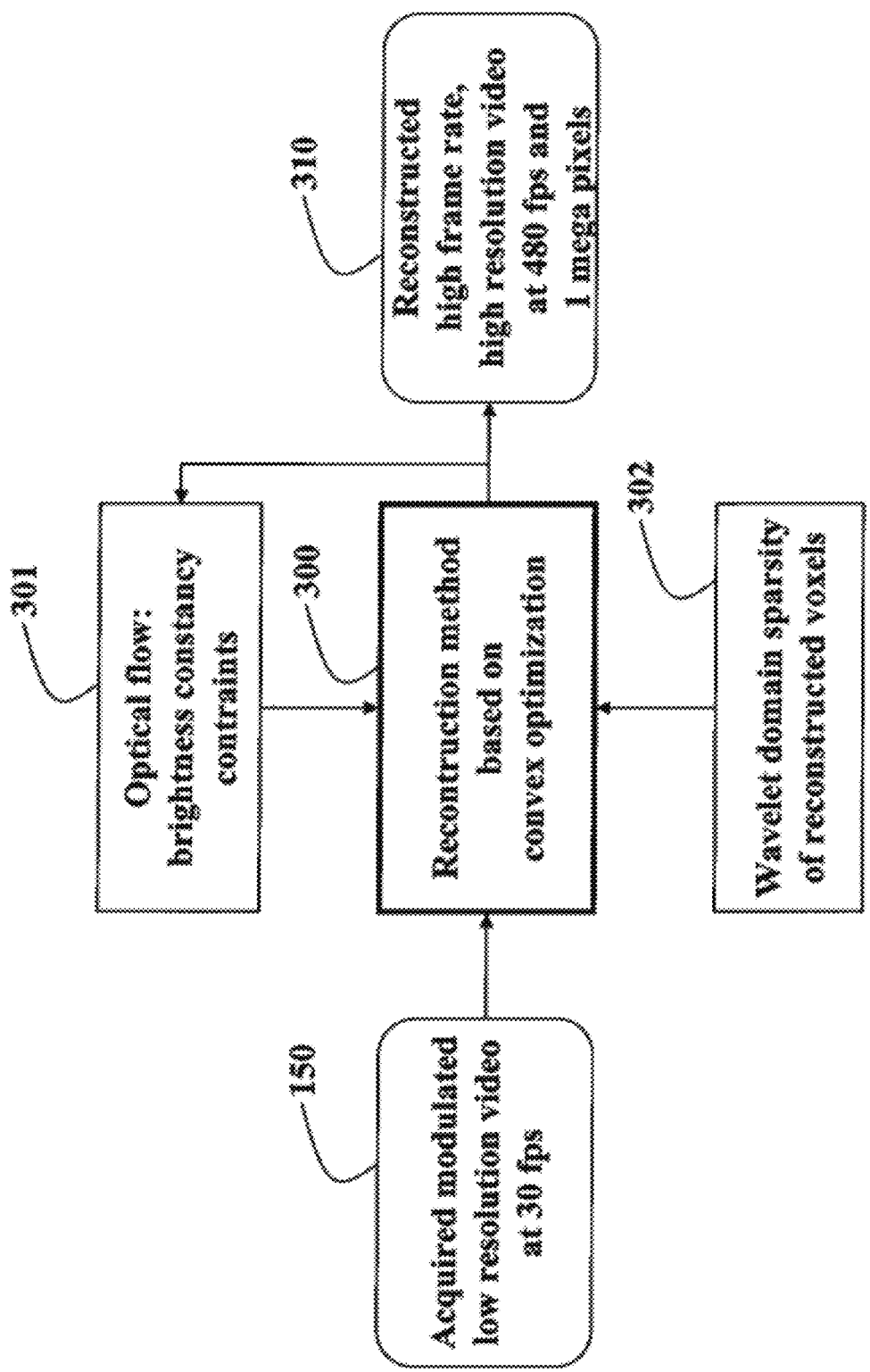
FIG. 3 is a flow diagram of a method for reconstructing a high frame rate, high resolution from a low frame rate, low resolution video according to embodiments of the invention.

As shown in FIG. 3, the video 150 acquired by the camera 100 is input to a reconstruction method 300, which is based on a convex optimization. The method uses brightness constancy constraints of the optical flow 301, and wavelet domain sparsity of reconstructed voxels 302. Output is the reconstructed video 310. It should be noted that the method can be implemented in a microprocessor or a hardware processing pipeline 160 in the camera, in which case, the output of the camera is the high speed video.

Imaging Architecture

A desired high frame rate video is X(s, t), where s and r are spatial coordinates temporal coordinates, respectively. Henceforth, we refer to the higher rate frames as 'subframes' because the acquired frames are generated by integrating the frames.

Our video camera enables us to acquire the modulated frames $Y(s_l, t_l)$, where $s_l$ and $t_l$ are spatial and temporal coordinates of the frames, and $L_s$ and $L_t$ are spatial and temporal sub-sampling factors, respectively. The acquired frame Y(:, :, $t_l$) at time $t_l$ is related to the subframes X as $$Y(:,:,t_1) = D_s \left( \sum_{t=(t_1-1)L_t+1}^{t_1 L_t} X(:,:,t) M(:,:,t) \right) \quad (1)$$

where M denotes a per-pixel temporal modulation function, X denotes the voxels of the video, and $D_s(\cdot)$ denotes a spatial subsampling operation. Notice that $L_t$ subframes of the original high speed video are modulated using $L_t$ independent high resolution masks, and are then added together to produce one acquired frame.

The spatial resolution of the sensor can also be lower. This is denoted by the spatial subsampling operation $D_s$.

In the preferred embodiment, we are mostly interested in increasing the temporal resolution of the video. Therefore, this description is mostly focused to the case where there is no downsampling in space. However, it is understood, that the camera and method described herein can be extended to a spatio-temporal problem, and numerous other applications, such as video super-resolution, denoising, interpolation and deblurring.

Matrix Vector Notation

We discretize an acquisition equation and represent the equation in matrix vector form. Because the acquired pixel intensities (Y) are linear combinations of the original high speed video voxels (X), where the weights of the linear combination are given by the modulation function (M), we can write the acquisition equation in matrix-vector form as $$y = \Phi x, \quad (2)$$

where $\Phi$ is the linear operator representing pixel-wise modulation and integration in time and sub-sampling in space, x and y are the vectorized form of the desired high speed subframes X and the acquired frames Y.

During each frame duration of our camera, we modulate the intensity of the incoming light (energy field) at each pixel with an independent binary code. For example, during the frame duration of a 20 fps camera, each pixel is temporally modulated with an independent binary code of length 8. This corresponds to a smallest exposure duration of 50/8=6.25 ms, which is the frame duration of the desired subframes. Note that the temporal binary code for the various pixels can be different, and codes of different lengths can also be used.

Temporal modulation with an independent binary code is equivalent to using a random binary mask at subframe durations, which selectively allows the light to be integrated at different pixels. Intuitively, this is can be understood as 'time stamping' the incoming light at subframe duration, which enables us to decode the integrated subframes using prior information on the video.

Contrast with Other Architectures

U.S. Pat. No. 7,580,620 describes a 'flutter shutter' (FS) camera that uses temporal coding pattern to deblur images. By fluttering the shutter during the exposure duration of a camera, high frequency information can be preserved in the image allowing one to invert the motion blur. There, the fluttering of the shutter applies equally to all pixels. The FS camera is suitable for motion deblurring and is limited to linear motion, or known motion direction and velocity.

In contrast, here, we modulate the pixels individually according to the corresponding modulations functions, which can be different for different combinations of pixels, subset of pixels, or subpixels. Our camera surpasses those limitations and is applicable to scenes with arbitrary and complex motion. Further, while the FS camera reconstructs a motion-deblurred image, we reconstruct a high speed video.

Our camera is also related to the single pixel camera and a random imager. In those cameras, the mixing between observations and the voxels is completely global. However, in our camera, the mixing is essentially local, i.e., there is coded mixing of nearby voxels that lead to each acquired pixel. This local mixing allows us to obtain good optical flow in the first iteration. In the absence of this locality property, we would not be able to obtain reasonable optical flow in the first iteration.

As described below, the optical flow is important for high fidelity high speed video reconstruction. The optical flow brightness constancy constraints 301 enable us to obtain much higher quality reconstructions 310 than would be possible without flow. This is one of the most important departures of our imaging architecture when compared with the prior art.

Moreover, our camera also exploits the cost benefit offered by conventional sensors, especially for visible wavelengths, by using a pixel array instead of a single pixel detector.

Camera Flexibility

Our camera provides an extremely flexible architecture and allows easy reconfiguration to achieve other imaging applications as required. A conventional camera with full image exposure amounts to using an 'all ones' spatio-temporal mixing code. A conventional camera with short exposure amounts to using a '10000000' spatio-temporal mixing function according to the invention.

The very same architecture can be used to realize flexible voxels, high dynamic range imaging, flutter shutter, and several similar applications. This flexibility of our imaging architecture is an important attribute because the architecture allows various functionalities to be realized by the same camera structure.

Model for Videos

Because our goal is to spatio-temporally super-resolve the acquired frames, the system of acquisition equations (2) is under-determined. To solve for the subframes x, we assume prior information on the spatio-temporal volume. It is well known that videos are redundant, both in space and time. Spatially, images are compressible in transform basis such as wavelets. This fact is used in Joint Photographic Experts Group (JPEG) compression. Temporally, the appearance in consecutive frames is often similar because the objects in the scene usually undergo slow motion, or the camera moves is slow. This redundancy in space and time has been used in various video compression standards, such as Moving Picture Experts Group (MPEG). To solve equation (2), we model the videos as compressible in spatial transform basis and having a temporal similarity of pixel neighborhoods.

Redundancy in Videos

Importance of Motion:

We assume the motion of objects in the scene is known, and the optical flow field is available. For the purpose of the description, we consider only the forward flow, but in our model we also use backward flow for increased accuracy.

The brightness constancy constraints correspond to a system of equations $$\Omega x = 0, \quad (3)$$

where every row of the matrix represents the brightness constancy equation of a spatio-temporal pixel. The knowledge of motion gives us additional constraints to reconstruct the subframes x, and we now solve $$\begin{pmatrix} y \\ 0 \end{pmatrix} = \begin{pmatrix} \Phi \\ \sqrt{\lambda} \Omega \end{pmatrix} x. \quad (4)$$

When the flow at a spatio-temporal pixel is a subpixel, we treat the pixel intensity as bilinearly interpolated by the closest pixels in the consequent frame. Furthermore, we do occlusion reasoning to determine which pixels have a consistent forward and backward flow. Pixels that are inconsistent are declared occluded, and we deleted rows from matrix corresponding to brightness constancy of occluded pixels. This ensures that the brightness constancy equations corresponding to pixels at motion boundaries are accurate.

Depending on the quality of optical flow, the brightness constancy equations can not be sufficient to ensure that equation (4) is well conditioned. To mitigate this problem and to increase accuracy to system of equation (4), we additionally incorporate the spatial redundancy. Hence, we regularize the above system of equations with the sparsity of the transform coefficients 202 of the desired subframes. We use a $l_1$ norm for minimizing the sparsity of the transform coefficients.

In particular, we have $$\min \sum_{t=1}^{T} \|\Psi^{-1} x_t\| \text{ s.t } \|y - \Phi x\|^2 + \lambda \|\Omega x\|^2 \le \epsilon, \quad (5)$$

where $\Psi$ is the transform basis and x is the vector form of $X(:,:,t)$, and $\epsilon$ is a small predetermined threshold.

Video Reconstruction

In practice, we do not have the optical flow field of the subframes a priori. However, the subframes and the optical flow between the subframes can be estimated alternately in an iterative way from the equation (4). We do so by boot-strapping with the help of the spatial sparsity alone.

We adapt the following iterative process where we first estimate the noisy images by regularizing only spatially, and without utilizing the motion constraints. We estimate the optical flow field from the denoised images and then use the optical flow field to estimate better images and continue this iteration until we reach a threshold of quality, as described below Alternating Iterative Reconstruction In an alternative iterative reconstruction, we estimate the noisy high speed images $x_0$ as $$\arg\min \sum_{t=1}^{T} \|\Psi^{-T} x_t\| \|\bar{s} \cdot t\| \|\bar{y} - \Phi x\|^2 \le \epsilon .$$

Begin Iteration

We denoise the estimate $x_{k\_}1$, and estimate the optical flow, perform occlusion reasoning, and construct the matrix $\Omega_{k-1}$ We estimate the high speed frames with the optical flow constraint $$x_k = \arg\min \sum_{t=1}^{T} \|\Psi^{-1} x_t\| \|s \cdot t\| \|y - \Phi x\|^2 + \lambda \|\Omega_{k-1} x\|^2 \le \epsilon .$$

End Iteration

For denoising the estimated noisy images, we use a conventional denoising process.

Applications

Applications that can use the camera include, but are not limited to full 2D modulation, consumer video cameras, high speed imaging. In a visual servoing, (VS) the camera feeds back information acquired by the sensor to control the motion of a robot.

In a barcode scanning and detection application the modulation can be along rows or columns, i.e., only in one direction, i.e., the modulation linear.

Other applications include video super-resolution, denoising, interpolation and deblurring.

EFFECT OF THE INVENTION

Our camera and processing pipeline architectures provide huge advantages over conventional imaging architectures.

First, it significantly reduces the bandwidth requirements at the sensor by exploiting a compressive sensing paradigm. Compressive sensing allows us to record observations at a sub-Nyquist rate but use prior information about the spatio-temporal consistency constraints, in the form of optical flow and spatial regularization, in order to reconstruct the high speed video from its sub-Nyquist measurements.

Secondly, it improves the light throughput of the system compared to acquiring a short exposure low frame rate video and allows acquisition at low light-levels. These are significant advantages because the prohibitive cost of high speed framers, is essentially due to the requirement for high bandwidth and high light sensitivity.

Third, the imaging architecture is extremely flexible allowing incorporation of several other functionalities including high dynamic range (HDR), assorted pixels and flexible voxels for content aware videography.

In addition, the video model and the accompanying reconstruction method that we develop is fairly generic, and can be used for applications, such as video denoising, super-resolution and interpolation without the need for additional hardware.

Our compressive camera exploits the fact that significant spatio-temporal redundancies exist in the video. As a guide, because the spatiotemporal redundancies exploited by conventional compression methods and our imaging architecture are very similar, one can assume that scenes that are compressed efficiently can be acquired well using our method.

In one embodiment, our modulator uses only a binary per-pixel shutter. This causes a 50% reduction in light throughput. Because most sensors already have the ability to perform 'dual mode' integration, i.e., change the gain of pixel, we can achieve non-binary modulations. While the 50% light loss is unavoidable for single sensor implementations, we can avoid this light loss if we use two sensors and a beamsplitter to measure both the coded images and the inverse coded images.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A camera for acquiring sequence of frames of a scene as a video, comprising:
   a sensor including an array of sensor pixels: and
   means for modulating each pixel of a sensor while acquirin, each frame of the video during a single exposure time of the camera, wherein each pixel is modulated individually and independently of other pixels, such that modulating combinations of the pixels, subsets of the pixels or subpixels can be different while acquiring each frame of the video, and wherein a rate of modulating the pixels is substantially higher than a frame rate of the camera.

2. The camera of claim 1, wherein the means for modulating further comprises:
   a mask arranged adjacent to the sensor, wherein the mask includes an array of mask pixels; and
   a modulation controller connected to the mask.

3. The camera of claim 2, wherein a mask pixel spatial resolution is substantially greater than a sensor pixel spatial resolution.

4. The camera of claim 2, wherein the means for modulating generates a binary sequence of ON and OFF signals that is independent for each sensor pixel.

5. The camera of claim 4, wherein the modulations functions include random binary sequences.

6. The camera of claim 2, wherein the mask is transmissive.

7. The camera of claim 2, wherein the mask is reflective.

8. The camera of claim 2, wherein a mask pixel resolution and a sensor pixel resolution are identical.

9. The camera of claim 2, wherein the mask defines subpixels on the Sensor.

10. The camera of claim 1, further comprising:
    means for reconstructing the video as a reconstructed video to have a frame rate substantially higher than a frame rate of the camera.

11. The camera of claim 10, wherein a spatial resolution and a temporal resolution of the reconstructed video is substantially greater than a spatial resolution and a temporal resolution of the video acquired by the camera.

12. The camera of claim 10, wherein a temporal resolution of the reconstructed video is substantially greater than a temporal resolution of the video acquired by the camera.

13. The camera of claim 10 wherein the means for reconstructing uses a sparsity of the video in a wavelet basis, a discrete cosine transform basis, or a Fourier basis.

14. The camera of claim 10 wherein the reconstructing uses optical flow constraints.

15. The camera of claim 10, wherein the means for reconstructing solves a convex optimization problem.

16. The camera of claim 10, wherein the reconstructed video has a higher spatial resolution than a spatial resolution of the camera.

17. The camera of claim 1, further comprising:
    controlling independently an integration time of each pixel.

18. The camera of claim 1, wherein the modulation functions include user controlled modulation functions.

19. The camera of claim 1, wherein the modulation functions are according to a grayscale sequence.

20. The camera of claim 1, wherein the modulation functions are according to a color sequence.

21. The camera of claim 1, wherein the modulation functions include discrete functions.

22. The camera of claim 1, wherein the modulation functions include continuous functions.

23. The camera of claim 1, wherein the modulation functions are application adaptive.

24. The camera of claim 1, wherein the modulation functions are adaptive to the scene.

25. A method for acquiring a sequence of frames of a scene as a video, comprising:
    modulating each pixel of a sensor of the camera during a single exposure time of the camera, wherein each pixel is modulated individually and independently of other pixels, such that modulating combinations of the pixels, subsets of the pixels or subpixels can be different while acquiring each frame of the video; and
    acquiring each frame of the video during the exposure time while modulating each pixel, and wherein a rate of modulating the pixels is substantially higher than a frame rate of the camera.

* * * * *